(No Model.)
M. MORAN.
MACHINE FOR CLEANING COTTON OR OTHER SEEDS.
No. 522,179. Patented June 26, 1894.
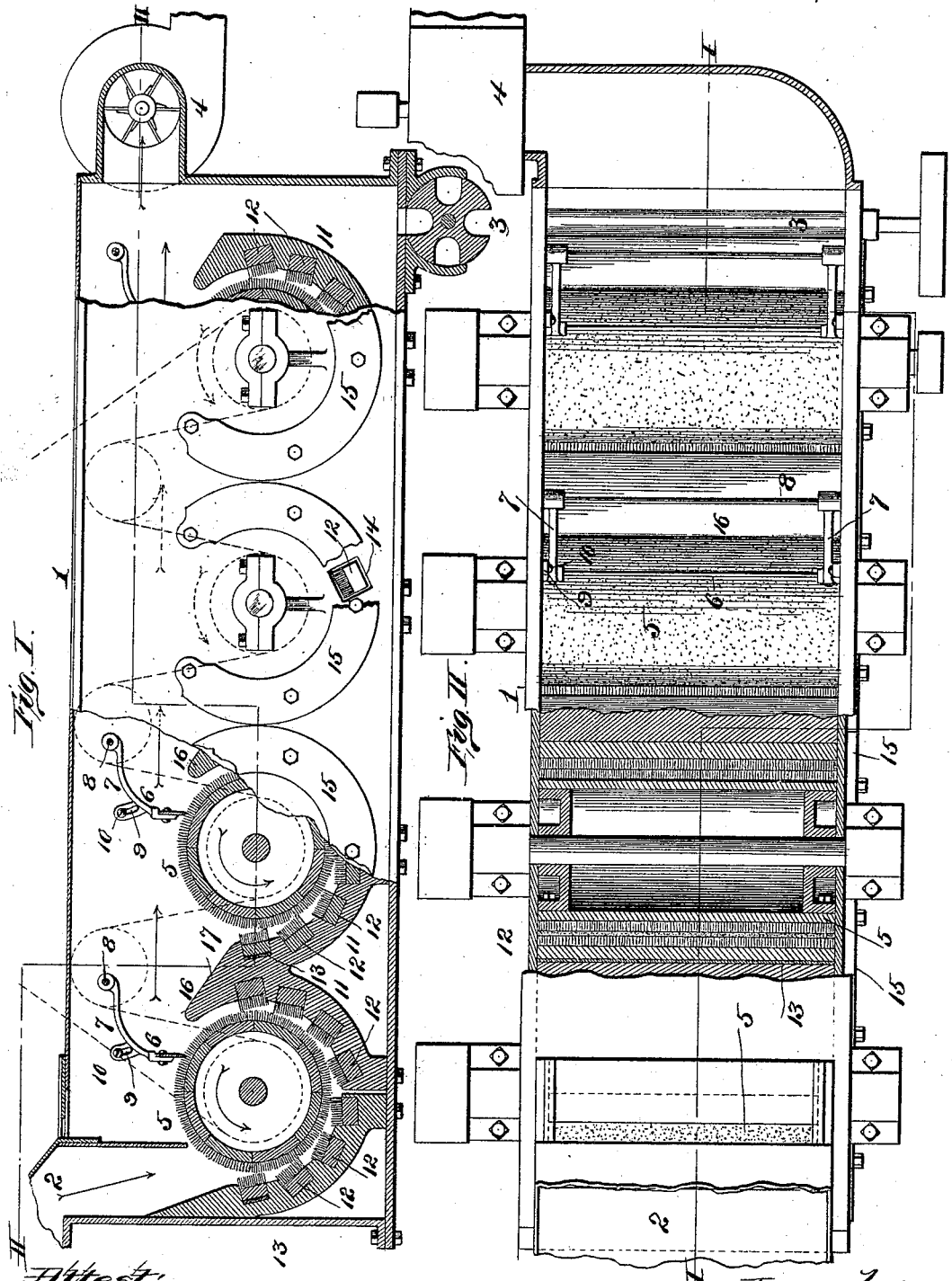
Attest:
Benj. A. Knight
A. W. Ebersole
Inventor:
Michael Moran.
By Knight Bros.
Attys

UNITED STATES PATENT OFFICE.

MICHAEL MORAN, OF ST. LOUIS, MISSOURI, ASSIGNOR TO RICHARD T. BLOW AND VICTORIA MORAN, OF SAME PLACE.

MACHINE FOR CLEANING COTTON OR OTHER SEEDS.

SPECIFICATION forming part of Letters Patent No. 522,179, dated June 26, 1894.

Application filed August 30, 1893. Serial No. 484,372. (No model.)

*To all whom it may concern:*

Be it known that I, MICHAEL MORAN, of the city of St. Louis, in the State of Missouri, have invented a certain new and useful Improvement in Machines for Cleaning Cotton or other Seeds, of which the following is a full, clear, and exact description, reference being had to the accompanying drawings, forming part of this specification.

My present invention relates to certain improvements in the class of machines shown and described in my Patent No. 500,102, dated June 20, 1893; and my present invention consists in features of novelty hereinafter fully described and pointed out in the claims.

Figure I is a view, part in elevation, and part in vertical section, and illustrative of my invention; the section being taken on line I—I, Fig. II. Fig. II is part in plan view, and part in horizontal section; the section being taken on line II—II, Fig. I.

Referring to the drawings, 1 represents the case or housing, having a feed chute 2, and which has a discharge valve 3, and an exhaust fan 4, as shown in my patent referred to.

5 represents the cylinders, located in the casing or housing, and which are provided with brushes or bristles on their peripheries, and which are provided with suitable means for turning them, as, for instance, such a means as is shown and described in my patent mentioned.

6 represents a comb arranged over each cylinder, to clean the bristles of lint which they may gather. These combs are secured to the lower ends of arms 7, pivoted at 8 to the housing of the machine, and each arm has a slotted lug or projection 9, to receive a set screw 10, by which the combs may be held to any adjustment relatively to the cylinders. The arms 7 of the brush supports are made curved, so that the brushes can be moved in a line almost directly toward and away from the periphery of the cylinders, and will have a considerable range of movement in these directions.

11 represents the concaves, which are recessed to receive brushes 12. The recesses in the concaves are so formed as to cause the faces of the brushes to set at an angle to the face of the cylinder, as clearly illustrated in Fig. I. The object of thus locating the brushes is to permit the seeds to enter the triangular spaces between the forward edges of the brushes and the cylinder, and entering here they are thoroughly operated upon by the inner edges of the brushes, which come very close to, or quite in contact with the bristles on the cylinders. This manner of setting the brushes relatively to the face of the cylinder is considered of much practical importance, particularly in treating such articles as cotton seeds to remove the lint. As the brushes become worn, they may be set up toward the cylinder, by inserting strips 13, (see Fig. I,) behind them, and to permit the easy setting up or adjustment of these brushes, as well as to permit the easy removal and insertion of the brushes themselves, I form openings 14 in one or both sides of the case or housing, opposite the recesses or grooves in the concaves, through which the brushes may be inserted, and outside of these openings 14 I removably secure plates 15, which can be quickly taken off by simply removing the nuts or bolts which hold them. One of these plates is shown broken away at 14, Fig. I, so as to illustrate what I mean. The discharge sides of the concaves have extensions 16, which extend upward beyond the center of the cylinders, and on an arc corresponding to the surface of the cylinders. The object of forming these extensions on the concaves, is to get the greatest amount of working surface out of each cylinder, while at the same time the passage of the seeds from one cylinder to another, is not retarded; the upper face of the projections 16 being inclined, as shown at 17, Fig. I, so that the seeds will readily pass from one cylinder to another.

The operation of this machine is much the same as the operation of the machine in my patent referred to, and it would be unnecessary, in this application, to repeat the operation.

The class of seeds upon which the machine is used is particularly cotton seeds, and grains, such as wheat, oats, rye, &c., although it may be used for other seeds.

I claim as my invention—

1. In a machine for cleaning seeds, the combination of the cylinders, recessed concaves, brushes located in the recesses of the concaves, said brushes having their faces set tangential to the periphery of the cylinders and means for adjusting the brushes, substantially as and for the purpose set forth.

2. In a machine for cleaning seeds, the combination of the cylinders, concaves, brushes fitting in the concaves with their faces at an angle to the periphery of the cylinders, and strips 13 for adjusting the brushes toward the cylinders; substantially as and for the purpose set forth.

3. In a machine for cleaning seeds, the combination of the cylinders, a housing inclosing the cylinders, and having openings 14, concaves arranged within the housing, and having recesses, brushes fitting in recesses of the concaves, and removable plates 15; substantially as and for the purpose set forth.

MICHAEL MORAN.

In presence of:
BENJN. A. KNIGHT,
ALBERT M. EBERSOLE.